Figure 1:
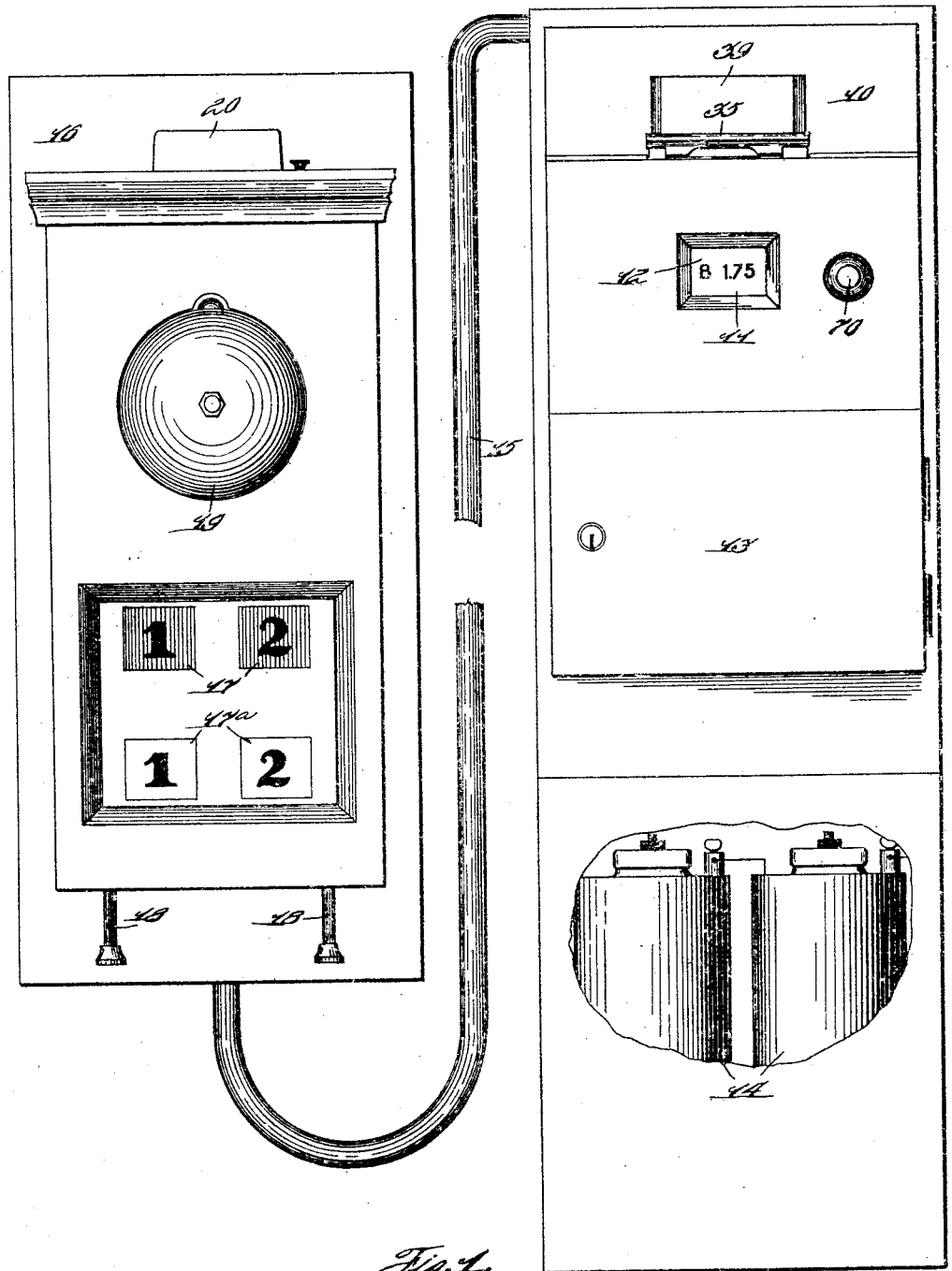

W. F. SCHWEIGER.
CHECK DISPLAYER AND ANNUNCIATOR.
APPLICATION FILED JUNE 25, 1904.

956,435.

Patented Apr. 26, 1910.
5 SHEETS—SHEET 1.

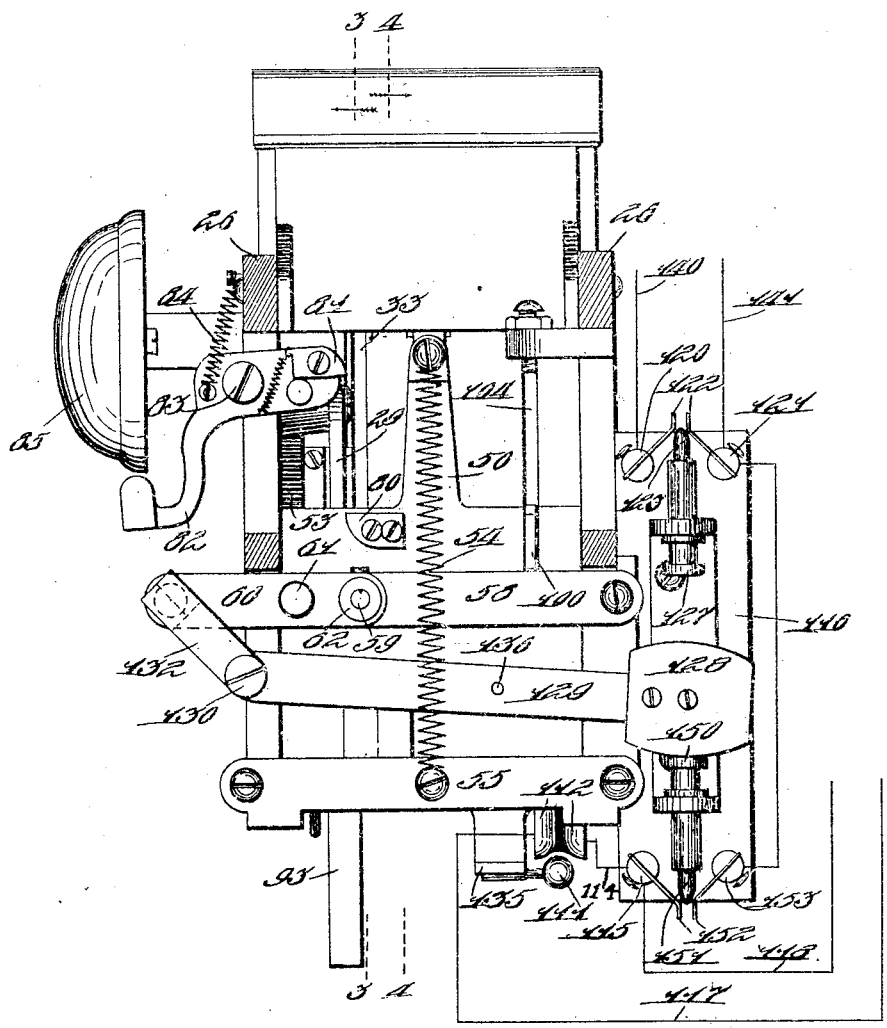

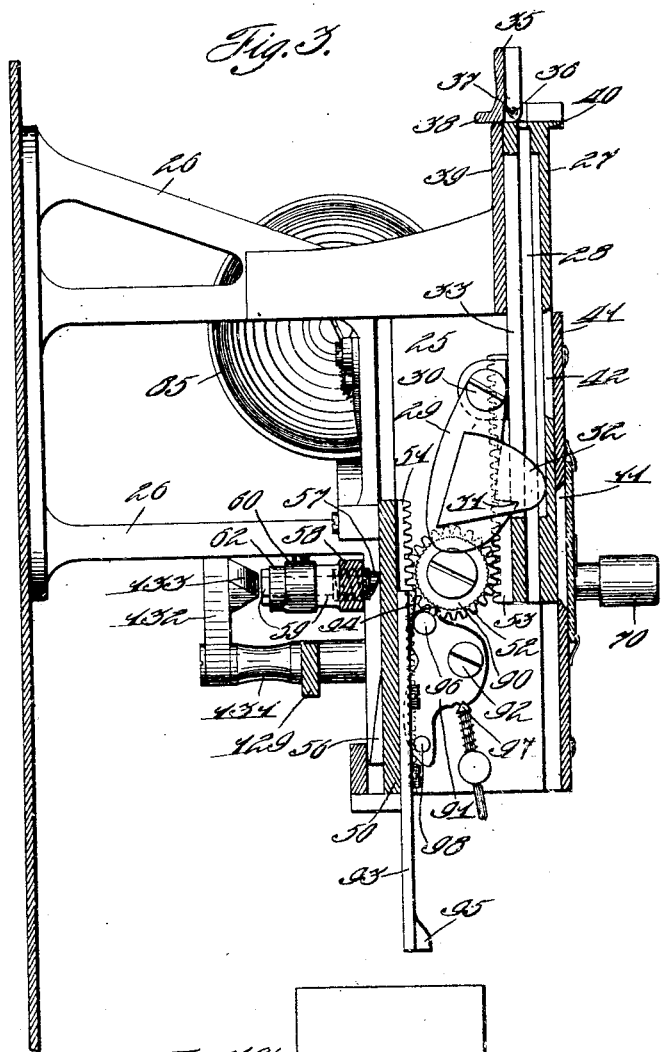

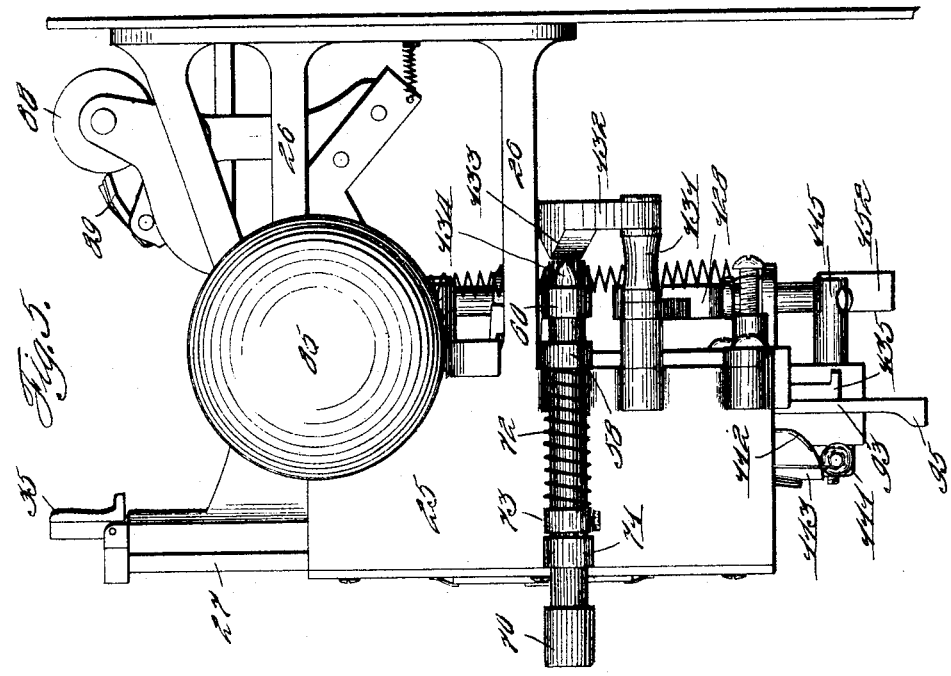

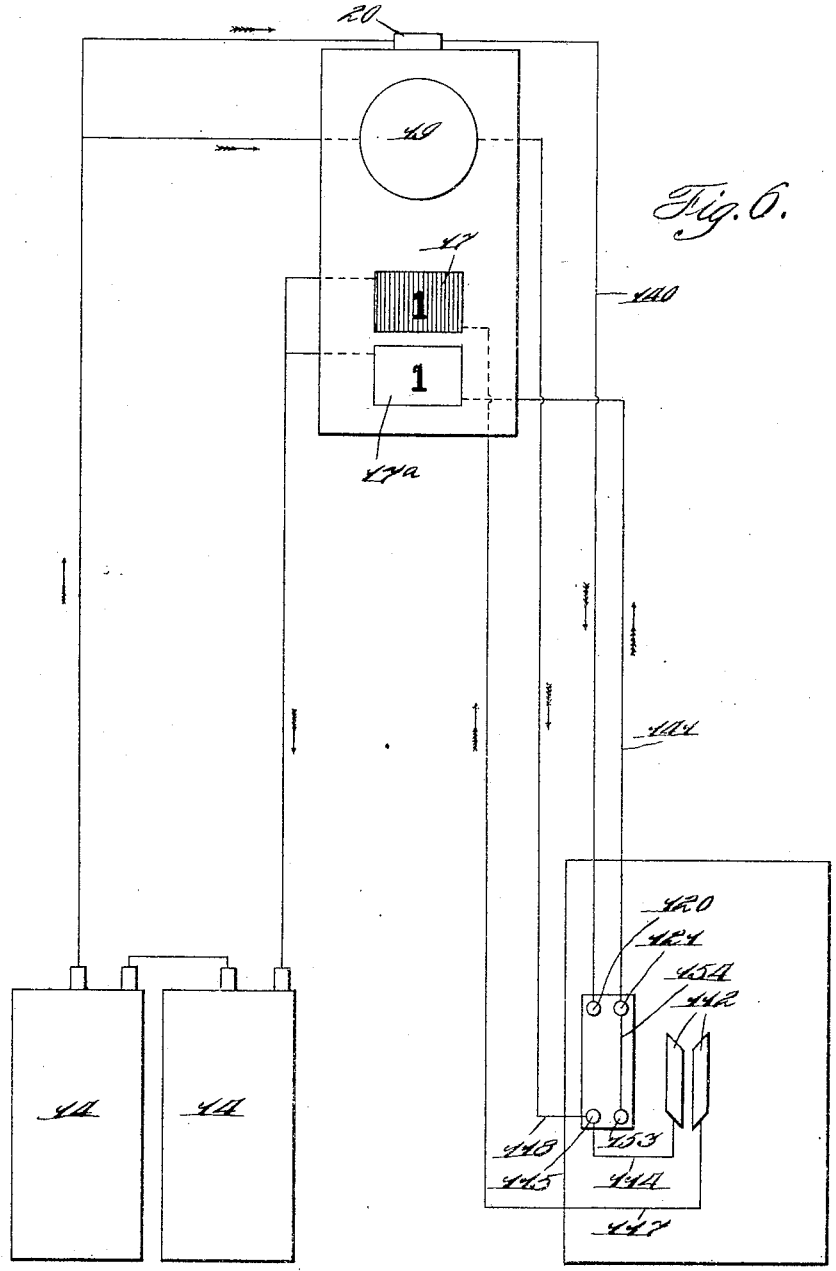

UNITED STATES PATENT OFFICE.

WILLIAM F. SCHWEIGER, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CHECK DISPLAYER AND ANNUNCIATOR.

956,435.   Specification of Letters Patent.   Patented Apr. 26, 1910.

Application filed June 25, 1904. Serial No. 214,195.

*To all whom it may concern:*

Be it known that I, WILLIAM F. SCHWEIGER, a citizen of the United States, residing at Dayton, in the county of Montgomery and State of Ohio, have invented certain new and useful Improvements in Check Displayers and Annunciators, of which I declare the following to be a full, clear, and exact description.

This invention relates to an improved form of check displayer mechanism in combination with a novel annunciator device, the purpose of the invention being to provide a machine which is adapted to receive and temporarily display inserted checks, certain indicating devices being operated upon the display of a check and certain other indicator or annunciator devices being provided which when actuated by a customer desiring service will restore the machine to normal condition and will give different indications according to the operative condition of the machine; and with these features there are combined certain protective devices to prevent fraudulent manipulation of the machine. These machines are intended for most advantageous use in places such as restaurants and similar places of business in which each of the several rooms is provided with one of the machines, and each machine is electrically connected with a central room where is stationed the cashier or the person having charge of the clerks who are to serve the various rooms.

With the several objects in view as above stated, a certain specific form of mechanism has been adopted to attain these ends it being of course understood that the invention is not to be limited to the specific structure shown and described since various other forms of mechanism might be evolved for the purpose of securing substantially the same results. In general terms the operation of this specific form of machine is as follows: The customer upon entering the room to procure the service of a waiter presses a push button which restores the machine to its normal condition and actuates a certain indicator at the cashier's room to show that a customer is to be waited upon in that particular room. If the cashier sends a waiter to that room but he does not reach there immediately, and the customer rings again for the waiter by pressing the same push button, this second operation of the push button actuates a different indicator to show the cashier that the waiter has not yet served that room. When however the waiter goes to the room and takes the order, he secures a check from the cashier for the amount of the order, and upon going to the room with the articles purchased he deposits the check within the machine and then operates the machine to display the check to the customers in the room, whereupon a signal is sounded in the machine to denote to the customer that the transaction is completed and to call attention to the check displayed showing the amount of the purchase, and simultaneously still another indicating device is actuated at the cashier's room to show that the waiter has deposited the check in the machine as he should do; and the check once being within the machine is beyond the control of the waiter and it displays the proper amount of purchase to the customer until the machine is again operated by a customer for a separate transaction in which case the previously inserted check is carried on into a locked receptacle within the machine and the machine is again restored to normal position ready for the insertion of a new check. As above stated, this is a general outline of the operation of a preferred form of machine, which of course is not to limit the broad scope of the inventions set forth; and a more detailed description of this preferred form of the machine will now be given, in connection with the drawings illustrating the same, in which:

Figure 1 represents a front elevation of the check displayer portion of the machine inclosed in its cabinet or casing and from which leads the cable inclosing the electric wires for connecting with the annunciator. Fig. 2 is a rear elevation of the check displayer portion of the apparatus, this check displayer portion containing the various electrical connections for operating the annunciator. Fig. 2ª represents a detail view of one of the plungers for making the electrical contact for the annunciator circuits. Fig. 3 represents a vertical cross section on the line 3—3 of Fig. 2 looking in the direction of the arrow crossing said line. Fig. 3ª is a detail view of the check used for insertion into the machine. Fig. 4 is a vertical cross section taken on the line 4—4 of Fig. 2 and looking in the direction of the arrow crossing said line. Fig. 5 is a side elevation of the right-hand side of the machine, or looking from the left of Fig. 2. Fig. 6 is a diagrammatic view of the electrical connections between the check displayer and the annunciator.

Referring to the accompanying drawings, in Fig. 1 is shown the casing 10 which incloses the check displayer portion of the apparatus, this casing having an opening at 11 to display the check 12 which is inserted into the machine by means of a chute hereafter to be described, the checks being held in displaying position and then moved forward into a receptacle within the casing access to which is had by means of a door 13 which is to be opened only by the proprietor or cashier for the purpose of securing the checks that have been inserted into the machine in connection with the various transactions. The lower portion of the casing 10 contains the electric batteries 14 which supply currents for the various electrical circuits and the electric wires from the casing 10 are combined into a cable 15 which leads from the check displayer portion of the machine to the annunciator 16 which is situated in the cashier's room, this annunciator being of a well known form and comprising annunciator tablets 17 bearing the figures 1 and 2, which tablets are moved to indicating position when the proper circuit is closed through the annunciator, the manner of actuating these tablets to expose the same being well known and not necessary to describe. The handles 18 serve to restore the tablets 17 to non-indicating position after they have once been actuated.

As above stated one of the check displayer instruments may be placed in each of the several rooms and all may be connected with the single annunciator in the cashier's room, in which case there will be as many distinct numerals shown in the annunciator as there are rooms, but the annunciator is herein shown in Fig. 1 as arranged for two rooms, viz., rooms Nos. 1 and 2, there being two annunciator tablets 17 and 17ᵃ for each room for the purpose to be later described, the upper one of said annunciators being colored red and the lower annunciator being colored white for readily distinguishing which annunciator tablet is operated. The annunciator also includes a bell 19 and a buzzer 20, these two alarm devices being connected appropriately with the check displayer portion in the manner to be described, and these two signaling devices 19 and 20 being differentiated in character for the purpose of indicating different conditions of the check displayer machine as will later be set forth in detail.

Referring now to the check displayer portion of the machine, the operative parts of the machine are mounted on or between side supporting plates 25 (see Fig. 3) which are hung upon supporting brackets 26. Sliding in suitable guide-ways in said plates 25 is a reciprocatory check chute 27 having formed therein a slot 28 into which is to be inserted the check 12 shown in Fig. 3ᵃ, which check is received by the waiter with each order and may if desired be of the ordinary paper strip form customarily issued from cash registers. This check chute 27 normally stands in uppermost position and is held latched in such position by means of a pawl 29 pivoted at 30 to the plate 25 and formed with a nose 31 which when the chute is in its uppermost position, projects into a corresponding notch formed in the rearward face of the chute so that by the engagement of the nose with this notch the chute is prevented from downward movement. Fast to the pawl 29 is a lug 32 which projects forward through a vertical slot 33 formed in the chute 27 and thereby projects into the slot 28 so that upon the insertion of a check within the chute the lower portion of the check strikes the lug 32 and forces backward the pawl 29 thereby withdrawing the nose 31 from the locking notch and permitting the downward movement of the check chute by hand pressure. A spring 34 (see Fig. 4) holds the check against the forward wall of the chute after the check has once been inserted. At the top of the chute is a lid 35 which is pivoted to the chute at 36 and is normally spring-pressed upward by means of the spring 37 (Fig. 3) so as to leave the aperture 28 open to permit the insertion of a check. As soon as the check chute is started downward after the check has once been inserted the rearward foot 38 of the lid strikes the stationary plate 39 which extends across the back of the chute and the lid 35 is thereupon positively turned upon its pivot 36 and the foot 38 now becomes vertical during the continued downward movement of the chute and is held locked by the stationary plate 39 so that the lid remains locked over the aperture 28 and prevents further access to the aperture and thereby prevents the subsequent withdrawal of the check after the chute has once been started downward, and by means of a full stroke device later to be described the chute having once been started downward must be moved its entire distance downward. This downward movement of the chute is limited by the projecting shelf 40 on the upper part of the chute striking the stationary cross plate or shield 41, which shield 41 has the sight opening 11 formed in it as above described; and the printed matter upon the check showing the amount of the purchase as indicated in Fig. 3ᵃ together with the initial of the waiter is so situated upon the check that when the chute is moved to this limit of its downward reciprocation, the printed figures upon the check are brought into alinement with the sight opening 11, the front plate of the chute being formed with a similar sight opening 42 which is brought into alinement with the sight opening 11 when the chute is moved to its lowermost position.

Coöperating with the reciprocatory chute 27 is a reciprocatory frame or carriage 50 (see Fig. 3) which carriage has attached to it a rack bar 51 which meshes with an intermediate pinion 52 which pinion in turn meshes with another rack bar 53 formed on the rear face of the chute 27 so that the downward movement of the chute will cause a corresponding upward movement of the carriage 50, and likewise the downward movement of the carriage 50 will cause an upward movement of the chute 27. This carriage 50 is normally held in lowermost position by means of a spring 54 (see Fig. 2) which is attached at its lower end to a stationary tie bar 55 and at its upper end is attached to the movable carriage 50. Thus when the chute 27 is pressed downward by hand the carriage 50 is moved upward against its spring tension, but when the chute 27 reaches its extreme downward movement a lug 56 (see Fig. 3) formed on the back of the carriage 50 locks over a spring-pressed plunger 57 which extends through a transverse bar 58 extending across between the side plates 25, the shank portion 59 of said plunger extending through a movable transverse bar 60 which is mounted upon a guide pin 61 (see Fig. 2), the rearward end of the shank 59 having upon it a head or collar 62 such that the rearward movement of the bar 60 in the manner to be described will act upon the head 62 to retract the plunger 57 from engagement with the lug 56 and allow the carriage 50 to return to normal position under the tension of the spring 54, thereby of course carrying the chute 27 to normal upward position. This rearward movement of the bar 60 for the purpose of retracting the plunger 57 is accomplished by means of a push button 70 shown in full in Fig. 5, which push button is supported by a bracket 71 extending laterally from the right-hand side plate 25 and by a similar bracket which forms the extension of the aforesaid cross bar 58, the push button is normally held in outward position by means of a spring 72 which acts upon a collar 73 fast upon the shaft of the push button. The rearward end of the push button is fast to the aforesaid transverse bar 60 so that when the push button is pushed inward or rearward by the operator, the bar 60 is carried backward sliding upon its guide pin 61 (see Fig. 2) and thereby retracts the plunger 67 to permit the carriage and chute to return to normal position in the manner just described. This push button 70 has other functions connected with the annunciator mechanism which will be later described.

In order to sound an alarm when the chute 27 is pushed downward in position to display the check, the carriage 50 has attached to it near its upper central portion a lug 80 which acts upon a trip pawl 81 attached to a bell hammer 82 pivoted to the right-hand side plate 25 at 83, so that upon the upward movement of the carriage 50 the lug 80 acts upon the pawl 81 to retract the bell hammer 82 against the tension of its spring 84 and thereby sound the alarm bell 85. The upper edge of the carriage 50 during this upward movement of the carriage also strikes a counter operating arm 86 (see Fig. 4) which is pivoted at 87 and at each operation adds one upon the counter wheel 88, the operating pawls 89 for this counter being of the well known construction for operating the counter one unit at a time and transferring by the usual deep notch device.

In order to compel a complete downward movement of the chute 27 when it is once started downward there is provided a full stroke device comprising a ratchet 90 (see Fig. 3) fast to the side of the intermediate pinion 52, and this ratchet is engaged by a pawl 91 pivoted at 92 to the inside face of the right-hand side plate 25. The front face of the carriage 50 has attached to it a narrow strip 93 which has formed at its upper end a projection 94 and at its lower end a corresponding projection 95. In the normal downward position of the carriage 50 the projection 94 strikes a pin 96 formed on the upper end of the pawl 91 and forces the pawl into engagement with the ratchet 90, it being temporarily held in this position by means of the spring-pressed plunger 97 during the upward movement of the carriage 50; but when the carriage has reached its extreme upward position the projection 95 strikes a pin 98 formed on the lower portion of the pawl 91 and rocks the pawl out of engagement with the ratchet 90, the pawl being held in this displaced position by the plunger 97 until the carriage has returned to normal lower position when the projection 94 again strikes the pin 96 and forces the pawl into engagement with its ratchet. Thus when the chute is once started downward it must be pushed to its extreme downward position before it can be released to return to normal upward position, and having once reached its lowermost position it is released by means of the push button 70 in the manner previously described to return independently of the full stroke device.

In order to insure the ejection of the check from the aperture 28 of the chute 27 upon the return of the chute to normal upward position, there is provided a check ejector pawl 100 (see Fig. 4) which is pivoted at 101 to a bracket 102 extending forward from the carriage 50, this pawl being formed with a forwardly projecting nose 103 which projects through a slot 104 (see Fig. 2) formed in the rearward face of the chute 27 so as to reach into the aperture 28 and engage the inserted check. The rear end of the pawl 100 is normally drawn downward by means of a spring 105 so as to force the nose 103 in engagement with the check, and when the chute 27 is carried downward the ejector pawl is free to move about its pivot so that the nose 103 engages the back of the check. Upon the release of the carriage 50 by means of the push button 70 in the manner previously described and the consequent return of the carriage 50 to lower position, the pawl 100 is carried downward and the pointed nose 103 bearing against the check carries the check downward with the pawl while the chute moves in the opposite direction to normal upward position, and at the extremity of the downward movement of the carriage 50 the nose 103 has just reached the end of the aperture 28, and at this point the rear end of the pawl strikes the aforesaid cross bar 58 rocking the rear end of the pawl upward and thereby retracting the nose 103 from engagement with the check to permit the check to drop into the locked receptacle below; and this contact of the ejector pawl with the bar 58 serves to give a sudden ejecting movement to the pawl 100 so as forcibly to eject the check from the aperture.

The connections for operating the annunciator mechanism by the check displayer portion of the machine will now be described.

The aforesaid bracket 102 (see Fig. 4) which projects forward from the carriage 50 has attached at its lower portion a spring arm 110 at the lower end of which is a metallic ball 111 which is adapted to run between two metallic electrodes 112 (see also Fig. 2) which are formed on the rearward side of a block 113 made of insulating material and attached to the lower portion of the left-hand side plate 25, and this block 113 is inclined at its upper and lower portions as shown in Fig. 4 so that when the carriage 50 moves upward the ball 111 will be carried along the rearward side of the block 113, and will descend upon the forward side of said block; thus upon the upward movement of the carriage 50 the ball 111 makes contact between the two metallic electrodes 112. As shown in Fig. 2, one of these electrodes is connected by a conducting wire 114 to a binding post 115 seated in an insulating block 116 which is attached to the left-hand side plate 25, certain other binding posts also being seated in this block 116 for conducting wires forming circuits the purpose of which will be later described. The other electrode 112 has leading from it a conducting wire 117 which leads to the annunciator portion of the machine through the cable 15 shown in Fig. 1; and leading from the aforesaid binding post 115 is a wire 118 which also leads to the annunciator. These connections are best shown in detail in Fig. 6 where it will be observed that the wire 118 leads to the bell 19 of the annunciator and thence to the batteries 14 and the wire 117 leads through the upper annunciator tablet 17 bearing the room designation "1" and thence to the battery 14. Thus it will be apparent from these connections that when the check chute is pushed down and the carriage 50 moves upward carrying upward the contact ball 111, the closing of the circuits at the electrodes 112 will cause the electric current in that circuit to sound the bell 19 and to actuate the annunciator tablet 17 so that the cashier upon hearing the bell has his attention called to the annunciator by seeing the upper tablet 17 displayed and knows that the waiter in the room corresponding to the number of this tablet has operated the check chute to deposit a check, this upper annunciator tablet 17 being preferably of a distinguishable color such as red so that it may easily be distinguished from the lower tablet 17ª which is actuated by different means. The check chute having been pushed downward by the waiter operating the same after the check has been inserted therein and the amount of the transaction displayed to the customer as previously explained, this completes this particular transaction as far as this waiter and this particular customer are concerned, and if a second customer wishes to secure the services of the waiter for this room he presses the push button 70, whereupon the carriage 50 and the check chute 27 are released to return to normal position in the manner hitherto set forth, but this pressing in of the push button 70 also actuates other indicating devices in the annunciator mechanism by means of electric circuits now to be explained.

Seated in the upper end of the aforesaid insulating block 116 (see Fig. 2) are two binding posts 120 and 121 extending from which are spring contact strips 122 in proximity to which strips is held a circuit closing plunger 123 which is seated within a collar 124 (see Fig. 2ª) and is normally spring drawn away from position to engage between the strips 122 by means of a spring 125. A pin 126 limits the retracting movement of this circuit closing plunger 123. The lower end of the plunger is formed with a head 127 which is in position to be engaged by an insulating block 128 fast upon the end of an oscillating circuit controlling arm 129 which is pivoted to the right-hand side frame at 130. This pivotal bearing of the arm 129 presses a rearwardly extending collar 131 (see Fig. 5) to which is attached an arm 132 having formed upon this upper end a double beveled projection 133 which coöperates with the bevel end 134 of the push button 70. Formed on the lower end of the carriage 50 is a rearwardly projecting foot 135 (see Fig. 4) which when the carriage 50 is moved upward strikes a pin 136 which extends forward from the circuit controlling arm 129, and thereby the foot 135 oscillates the arm 129 about its pivotal point and carries the block 128 upward into proximity to the head 127 of the circuit closing plunger 123. This upward return of the arm 129 rocks the arm 132 downward to a slight extent so as to bring the upper surface of the double beveled projection 133 into the path of the bevel end 134 of the push button 70. Therefore when the push button is pushed in to release the carriage 50 in the manner described the bevel end 134 strikes the upper bevel of the projection 133 and rocks the arm 132 farther downward thereby rocking the arm 129 upward to a further extent to carry the block 128 into contact with the plunger head 127 and thus force the plunger 123 in between the strips 122. This completes the electric circuit through these strips as follows: Leading from the binding post 120 is a conducting wire 140 which as shown in Fig. 6 leads to the aforesaid buzzer 20 of the annunciator and thence to the batteries 14; and from the other binding post 121 leads a conducting wire 141 which goes to the lower annunciator tablet 17ª and thence to the batteries 14, so that the completion of the circuit by the pressing in of the push button 70 causes the sounding of the buzzer at the annunciator and the dropping of the lower annunciator tablet 17ª displaying the numeral 1 upon that tablet, this tablet being preferably white or of some color enabling the cashier readily to distinguish it from the upper tablet which has been stated will be colored red as a distinguishing characteristic. As soon as the cashier hears the sound of the buzzer and sees a lower white tablet of the annunciator dropped into displaying position, he is informed that the service of a waiter is desired in the room whose number is indicated upon the tablet. As has heretofore been explained, as soon as the customer presses the push button 70 the carriage 50 is released and springs back to normal lower position and the check chute returns to normal upper position thus restoring the check displayer portion of the machine to normal condition; but this dropping of the carriage drops the projecting foot 135 from contact with the pin 136 carried by the aforesaid controlling arm 129 so that the arm 129 drops into the position shown in Fig. 2 with the block 128 resting upon a head 150 of a plunger 151 the construction of which is similar to the previously described plunger 123, this plunger 151 having a spring for holding the plunger in normal upward position, this spring being similar to the before described spring 125 of the other plunger 123. This spring of the lower plunger is of such strength as to retain the plunger in normal upward position even though the block 128 is resting upon the head 150 as it does rest when the carriage 50 is in its normal lower position. Now however if the customer again pushes the push button 70 owing to the fact that the waiter has not yet arrived at the room, it will be observed that since the arm 129 has dropped to lower position, the arm 132 has been raised to carry the under side of the double beveled projection 133 into the path of the beveled end 134 of the push button 70, so that when the push button is now forced inward by the customer the double beveled end 134 strikes this under side of the double beveled projection and forces the arm 132 still farther upward thereby carrying the arm 129 downward and consequently causing the block 128 to force the plunger 151 downward between the two metal strips 152 one of which strips is attached to the previously described binding post 115 and the other of which is attached to the binding post 153, the construction of these strips being similar to the construction of the previously described strips 122 at the upper end of the insulating block 116. The forcing of the plunger 151 between these strips 152 results in the closing of another electric circuit through the annunciator as follows: The binding post 115 has already been described as having leading from it the conducting wire 118 which leads to the bell of the annunciator as shown in Fig. 6. Leading from the binding post 153 is a wire 154 which simply connects the binding post 153 with the upper binding post 121 as shown in Fig. 2; and as already described the binding post 121 is, by means of the wire 141, connected to the lower annunciator tablet 17ª as shown in Fig. 6. Thus it will be observed that when the customer gives a second operation to the push button 70 (after the first operation in which the check chute is returned to normal position) this second operation of the push button has the effect of displaying the same lower annunciator tablet 17ª but of ringing the bell 19 of the annunciator instead of sounding the buzzer 20, so that the cashier upon seeing the white tablet displayed and hearing the bell sounded simultaneously with the display of this lower tablet, knows that the waiter has not yet served the customer in this particular room; and with each successive operation of the push button 70 by the customer the same combination of signals, viz., the bell and the lower annunciator will be actuated until the clerk serves the room and inserts the check into the chute to display the amount of the purchase to the customer, in which case as already described the upward movement of the carriage 50 causes the contact ball 111 to slide over the plates 112 and thereby close the electric circuit to ring the same bell 19 but to actuate the upper or red annunciator tablet 17 in which case the cashier immediately knows that the customer has been served and the check properly deposited in the box; and this upward movement of the carriage 50 moves the circuit controlling arm 129 upward as already explained so as to shift the double beveled projection 133 into such position that upon the next operation of the push button 70 the buzzer 20 will be sounded simultaneously with the display of the lower annunciator tablet 17ª as has already been set forth. It will thus be observed that in each case in which the push button 70 is operated, the lower or white annunciator tablet 17ª will be operated but when the check chute is in normal upward position the bell 19 is actuated, and when the check chute is in lower position the buzzer 20 is actuated, and by this differentiation in the indication for these two cases, the cashier is enabled to know exactly the condition of the check displayer portion of the machine and after having received either of these differentiated indications in connection with the display of the lower annunciator tablet, he knows that the transaction in that particular room has not been completed until he hears the bell 19 sounded in connection with the display of the upper or red tablet indicator.

While the form of mechanism here shown and described is admirably adapted to fulfil the objects primarily stated, it is to be understood that it is not desired to confine the invention to the one form of embodiment here disclosed, for it is susceptible of embodiment in various forms all coming within the scope of the claims which follow.

Having thus described my invention, what I claim as new and desire to secure by Letters Patent is:

1. In a check displayer, the combination with a movable chute having an aperture for the insertion of a check, of a closing member for said aperture normally permitting access thereto, and means for automatically operating said closing member by the movement of the chute, to completely close said aperture after said check has been inserted.

2. In a check displayer, the combination with a movable chute having an aperture for the insertion of a check, of means for automatically completely closing said aperture by the movement of said chute after the check has been inserted.

3. In a check displayer the combination with a movable chute having an aperture for the insertion of a check and a sight opening for displaying the check, of a closing member for said aperture normally permitting access thereto and means for automatically operating said closing member by the movement of the chute to completely close said aperture after said check has been moved into position to be displayed.

4. In a check displayer, the combination with a movable chute having an aperture for the insertion of a check and having a sight opening for the display of said check, of a shield also having a sight opening for the display of said check after the chute has been moved, and means for automatically closing said aperture after the initial movement of said chute.

5. In a check displayer, the combination with a chute having an aperture for the insertion of a check and having a sight opening for the display of the same, of a lid attached to said chute coöperating with means for automatically operating said lid to close said aperture after said check has moved to displaying position.

6. In a check displayer, the combination with a movable chute having an aperture for the insertion of a check and having a sight opening for the display of the same, of a shield also having a sight opening for the display of the check after the chute has been moved, and a lid attached to said chute and coöperating with means for automatically operating said lid to close said aperture after the initial movement of said chute toward its position to display the check.

7. In a check displayer, the combination with a movable chute having an aperture for the insertion of a check and having a sight opening for the display of the same, of a shield also having a sight opening for the display of the check after the chute has been moved, a lid attached to said chute, and a relatively stationary projection for engaging said lid to operate the same to close said aperture after the initial movement of said chute toward displaying position.

8. In a check displayer, the combination with a movable chute having a check insertion aperture, of means for locking said chute in normal position, said means being positioned to be released by the insertion of a check in the chute, a device for automatically locking the chute in adjusted position at each operation of the machine, and means for releasing said locking device at will.

9. In a check displayer, the combination with a movable chute having a check insertion aperture, of a pawl extending into said chute and locking the same in normal position, a projection on said pawl positioned to be engaged by an inserted check to release said chute, means for automatically locking said chute in adjusted position at each operation of the machine, and hand operated means for releasing said locking means.

10. In a check displayer, the combination with a movable chute having a check insertion opening, of a pawl extending into and locking said chute in normal position, said pawl being positioned to be engaged and released by an inserted check, and a distant signal caused to operate by the adjustment of said chute after the same has been released.

11. In a check displayer, the combination with a chute having an aperture for the insertion of a check, of an ejector extending into said aperture and engaging said check, and a relatively stationary device with which said ejector engages and is thereby moved, to cause ejection of the check.

12. In a check displayer, the combination with a movable chute having an aperture for the insertion of a check and a sight opening for the display of the same, of an ejector arranged to extend within said aperture, means for operating said ejector to carry the same into said aperture to engage the check upon movement of the chute, and means for subsequently actuating said ejector to eject the check from the chute.

13. In a check displayer, the combination with a movable chute having an aperture for the insertion of a check and having a sight opening for the display of the same, of means for latching said chute in operated position displaying said check, and means for releasing said latching means to permit the chute to return to normal non-displaying position.

14. In a check displayer, the combination with a movable chute having an aperture for the insertion of a check and having a sight opening for the display of the same, of a shield also having a sight opening normally out of alinement with the sight opening of the chute, check releasable means for locking said chute in normal position, means for latching said chute in operated position with said two sight openings in alinement to display said check, and means for releasing said chute to permit the same to return to normal position.

15. In a check displayer, the combination with a movable chute an aperture for the insertion of a check and having a sight opening for the display of the same, of a shield also having a sight opening normally out of alinement with the sight opening of the chute, check releasable means for locking said chute in normal position, means for latching said chute in operated position with said two sight openings in alinement to display said check, means for releasing said chute to permit the same to return to normal position, and check ejector means operated upon the return of said chute to normal position to eject said check from the chute.

16. In a check displayer, the combination with a movable check chute and a movable carriage; of means connecting said carriage and said chute to move the former by the movement of the latter; and means for latching the carriage operated position to hold the chute in operated position.

17. In a check displayer, the combination with a movable check chute and a movable carriage; of means connecting said carriage and said chute to move the former by the movement of the latter; means for latching the carriage in operated position to hold the chute in operated position; and check ejector means controlled by said carriage.

18. In a check displayer, the combination with a reciprocatory chute having an aperture for the insertion of a check; of a reciprocatory carriage; racks carried by said chute and said carriage coöperating with an intervening gear to reciprocate said carriage by the reciprocation of said chute; a check ejector carried by said carriage and extending into said aperture; and a stationary projection for engaging said ejector at the extremity of the movement of said carriage in one direction.

19. In a check displayer, the combination with a reciprocatory chute having an aperture for the insertion of a check; of a reciprocatory carriage; racks carried by said chute and said carriage coöperating with an intervening gear to reciprocate said carriage by the reciprocation of said chute; a check ejector carried by said carriage and extending into said aperture; a stationary projection for engaging said ejector at the extremity of the movement of said carriage in one direction; a latch for holding the carriage in operated position; a spring for restoring the carriage and the chute to normal position; hand operative means for releasing said latch; and a signaling device operated by said hand operative means.

20. In a check displayer and annunciator, the combination with a movable check chute having a sight opening for the display of said check; of a movable carriage; means connecting said carriage and said chute for moving the former by the movement of the latter; an electric signaling device including a circuit therefor; and means carried by said carriage for closing said circuit after the initial movement of the chute and until the chute has been moved to position to display said check.

21. In a check displayer and annunciator, the combination with a check chute having a sight opening for the display of said check; of hand operative means for effecting the withdrawal of said check from its position of view at said opening; and means controlled by said hand operative means for giving sensorially differentiated signals upon successive operations of said hand operative means.

22. In a check displayer and annunciator, the combination with a movable check chute; of means for latching the same in operated position; releasing means for operating said latch to permit the chute to return to normal position; a plurality of differentiated signals; and means controlled by said releasing means to actuate said signals successively to give differentiated indications upon successive operations of said releasing device.

23. In a check displayer and annunciator, the combination with a reciprocatory check chute having a sight opening for the display of said check; of latching means for holding said chute in operated position to display said check; a signal device; hand operative means for releasing said latching means to permit the chute to return to normal position; means connected with said hand operative means for actuating said signal device upon such release of said chute; and a second signal device differentiated from the first mentioned signal device and operated by said hand operative means upon the next successive operation thereof after the release of said check chute.

24. In a check displayer and annunciator, the combination with a movable check chute; of means for latching the same in operated position; differentiated signal devices; a signal actuator common to said signal devices the selective operative positioning of which is controlled by the movement of said chute; and means for releasing said chute latch and for simultaneously operating said signal actuator according to its predetermined position.

25. In a check displayer and annunciator, the combination with a movable check chute having a sight opening for the display of the check; of means for latching the chute in operated position to display said check; two distinguishable electric signaling devices and circuits therefor; a circuit closer common to said two circuits; means connected with said chute for positioning said circuit closer for the subsequent actuation of one or the other of said signaling devices; hand operative means for releasing said latch to permit the chute to return to normal position; and means connected with said hand operative means for actuating said circuit closer in either of its selective positions.

26. In a check displayer and annunciator, the combination with a movable check chute having a sight opening for the display of the check; of means for latching said chute in operated position to display the check; two differentiated electric signaling devices and circuits therefor having circuit closing plungers situated in juxtaposition; a circuit closer arm oscillating between said plungers and formed with a double beveled operating projection; an abutment formed on said chute for positioning said arm into proximity with one or the other of said plungers according to the position of said chute; and a push button for engaging said latch to release said chute and also for engaging said double beveled projection to operate on one side or the other on said double bevel according to its previous positioning by the chute whereby to actuate one signal upon the release of the chute and to actuate the other signal upon the next successive operation of the push button prior to any subsequent movement of the chute.

27. In a check displayer and annunciator, the combination with a movable check holder, of a plurality of signaling devices; a manipulative device common to said signaling devices for causing the same to be actuated; and means controlled by the position of said check holder for causing said common manipulative device to operate selective signals.

28. In a machine of the character described, the combination with an indicating device for use in connection with the display of amounts of various transactions, of a plurality of differentiated signals; manipulative means for actuating said signals; and means for causing said manipulative means to actuate different signals according to the operative position of said indicating device.

29. In a check displayer, the combination with a chute having an aperture for the insertion of a check and having a sight opening for the display of said check, and a shield also having a sight opening for the display of said check after the chute has been moved, means for automatically closing said aperture after the initial movement of said chute, and means for compelling a complete movement of said chute.

30. In a check displayer, the combination with a movable check displayer having an aperture for the insertion of a check and having a sight opening for the display of the same, of a lid attached to said check displayer coöperating with means for automatically operating the lid to close the aperture after said check has moved to displaying position and means compelling a complete operation of the chute.

31. In a check displayer, the combination with a movable chute having an aperture for the insertion of a check and having a sight opening for the display of the same of a shield also having a sight opening for the display of the check after the chute has been moved, a lid attached to said chute and coöperating with means for automatically operating said lid to close said aperture after the initial movement of said chute toward its position to display the check and means compelling a complete movement of the chute.

32. In a check displayer, the combination with a movable chute adapted to have a check inserted therein, of a movable ejector operated by the movement of said chute but in reverse direction, and means for causing said ejector to eject the check at the end of the movement of the chute.

33. In a check displayer, the combination with a movable chute having an aperture for the insertion of a check and having a sight opening for the display of the same, of means for latching said chute in operated position displaying said check, and manipulative means for releasing said latching means to permit the chute to return to normal non-displaying position.

34. In a check displayer, the combination with a movable chute having an aperture for the insertion of a check and having a sight opening for the display of the same, of a shield also having a sight opening normally out of alinement with the sight opening of the chute, check releasable means for locking said chute in normal position, means for latching said chute in operated position with said two sight openings in alinement to display said check, and manipulative means for releasing said chute to permit the same to return to normal position.

35. In a check displayer, the combination with a movable chute adapted when moved to display a check, of means for locking said chute in adjusted position and a key for releasing said locking means.

36. In a check displayer the combination with a movable check chute and a movable carriage, of means connecting the chute and carriage to move the carriage by the movement of the chute and means to return the carriage to normal position and thereby return the chute to normal position also.

37. In a machine of the class described, the combination with a manipulative check displayer device, of a plurality of visible and of audible signals, electric connections intermediate the check displaying device and visible and audible signals for actuating the same in pairs, one component of each pair being audible and the other visible; and means controlled by the check displaying device for actuating said pairs successively, whereby the actuation of one of the visible signals is attended by an actuation of one or another of the audible signals.

38. In a check displayer, the combination with a movable chute having a check insertion opening, of check controlled means for locking said chute in normal position, a distant signal device; and electric connections for operating said signal device, constructed to be energized by the movement of said chute after the same has been released.

39. In a machine of the class described, the combination with a check displaying device, of a plurality of visible and a plurality of audible signals, electrical connections intermediate the check displaying device and the visible and audible signals for operating said signals in pairs, one component of each pair being visible and the other audible; and means controlled by the check displaying device for actuating an audible signal in company with any one of the plurality of visible signals.

40. In a check displayer, the combination with a movable check chute having a sight opening for the display of a check, a signaling device, means controlled by a movement of the chute to display the check for operating said device, a manipulative device, and means controlled thereby for returning the check chute to normal position, ejecting the check therefrom and operating a second signaling device.

In testimony whereof I affix my signature in the presence of two witnesses.

WILLIAM F. SCHWEIGER.

Witnesses:
Wm. O. Henderson,
W. M. McCarthy.

It is hereby certified that in Letters Patent No. 956,435, granted April 26, 1910, upon the application of William F. Schweiger, of Dayton, Ohio, for an improvement in "Check Displayers and Annunciators," errors appear in the printed specification requiring correction as follows: Page 7, line 56, after the word "chute," the word *having* should be inserted, and same page, line 75, after the word "carriage," the word *in* should be inserted; and that the said Letters Patent should be read with these corrections therein that the same may conform to the record of the case in the Patent Office.

Signed and sealed this 26th day of July, A. D., 1910.

[SEAL.]                                            F. A. TENNANT,

*Acting Commissioner of Patents.*